(12) United States Patent  
Sprague et al.

(10) Patent No.: US 7,715,103 B2
(45) Date of Patent: May 11, 2010

(54) BURIED NUMERICAL APERTURE EXPANDER HAVING TRANSPARENT PROPERTIES

(75) Inventors: Randall B. Sprague, Carnation, WA (US); Mark O. Freeman, Snohomish, WA (US); Christian Dean DeJong, Sammamish, WA (US); Jacques P. Lincoln, Seattle, WA (US); Karlton D. Powell, Lake Stevens, WA (US)

(73) Assignee: Microvision, Inc., Redmond, WA (US), 02

( * ) Notice: Subject to any disclaimer, the term of this patent is extended or adjusted under 35 U.S.C. 154(b) by 312 days.

(21) Appl. No.: 11/852,628

(22) Filed: Sep. 10, 2007

(65) Prior Publication Data

US 2009/0067057 A1    Mar. 12, 2009

(51) Int. Cl.
*G02B 27/10* (2006.01)
*G02B 27/14* (2006.01)

(52) U.S. Cl. ..................... 359/619; 359/630

(58) Field of Classification Search ......... 359/619–626, 359/629, 930; 345/7–9
See application file for complete search history.

(56) References Cited

U.S. PATENT DOCUMENTS

| | | | |
|---|---|---|---|
| 3,807,849 A | 4/1974 | Lobb | |
| 4,634,220 A * | 1/1987 | Hockert et al. | 359/626 |
| 6,043,937 A | 3/2000 | Hudson et al. | |
| RE38,245 E * | 9/2003 | Morris et al. | 359/619 |
| 2004/0135742 A1 | 7/2004 | Weber et al. | |
| 2004/0196438 A1 | 10/2004 | Togino | |
| 2006/0098272 A1 | 5/2006 | Lerner et al. | |
| 2006/0221022 A1 | 10/2006 | Hajjar | |
| 2007/0103747 A1 | 5/2007 | Powell et al. | |

FOREIGN PATENT DOCUMENTS

| | | |
|---|---|---|
| EP | 0151703 | 8/1985 |
| EP | 0463888 | 1/1992 |
| WO | WO8903059 | 4/1989 |

* cited by examiner

*Primary Examiner*—Alicia M Harrington
(74) *Attorney, Agent, or Firm*—Kevin D. Wills

(57) ABSTRACT

Briefly, in accordance with one or more embodiments, a buried numerical aperture expander may be utilized to provide a head-up or virtual display at a larger field of view without requiring a larger amount of space, larger sized display, or larger sized optics. The buried numerical aperture expander is capable of selectively reflecting light emanating from a display such that the reflected light is expanded into a larger field of view, while simultaneously allowing other light to be transmitted through the buried numerical aperture expander without expansion so that the buried numerical aperture expander may be deployed in conjunction with a windshield or window without adversely affecting the ability to see through buried numerical aperture expander.

25 Claims, 8 Drawing Sheets

BURIED NUMERICAL APERTURE EXPANDER HAVING TRANSPARENT PROPERTIES

BACKGROUND

Vehicles are increasingly being outfitted with head-up displays (HUD) at the factory. As HUDs become more widely utilized and as active safety technologies become more broadly deployed in vehicles, many automotive manufacturers and drivers will find that HUD implementations increase driver situational awareness and present active vehicle safety technologies, including adaptive cruise control, collision avoidance, night vision, lane departure warning and blind spot detection with greater efficacy. Additionally, as HUDs become more widely utilized, many users will chose to use an after-market HUD implementation in vehicles that did not include a HUD installed at the factory. To make a HUD, it is common to place a light emitting image plane parallel to the dashboard such that the emitted light reflects off the windshield and into the viewer's eye. This light emitting image can be made from traditional flat panels such as liquid-crystal displays (LCD), light emitting diode based displays (LED), or organic light emitting diode (OLED) based displays, or alternatively from projection technologies such as scanned laser beam displays, digital light processing (DLP) displays, or liquid-crystal display (LCD) microdisplays. Such display approaches typically require a device size that relates to the image size desired for the HUD so that in order to create a HUD having a larger field of view (FOV), larger sized displays and/or bulky optics are needed to achieve the desired magnification. However, space is typically at a premium in vehicles, and there is often not enough room in the vehicle for larger sized displays or optics.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1A:
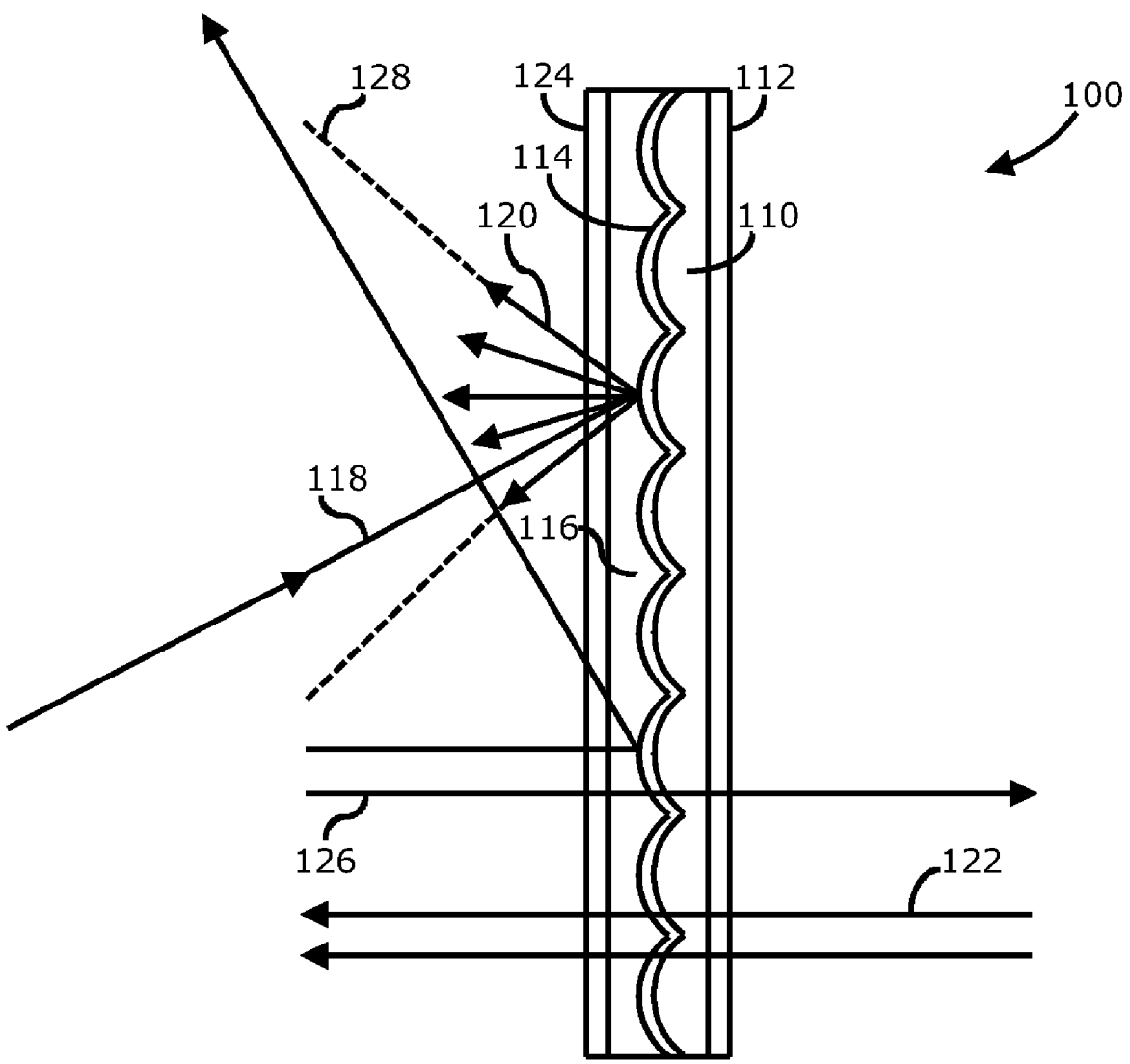
FIG. 1A is a diagram of a cross sectional view of a buried numerical aperture expander having an exit pupil expander in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1A, a diagram of a cross sectional view of a buried numerical aperture expander having an exit pupil expander in accordance with one or more embodiments will be discussed. In one or more embodiments, buried numerical aperture expander 100 may be constructed to reflect certain incident light rays 118 wherein the reflected light rays 120 may be expanded to a desired output expansion cone 128 to provide a larger field of view (FOV) of a reflected image. The property of expanding reflected light rays 120 may also be referred to as numerical aperture (NA) expansion. Furthermore, buried numerical aperture expander 100 is constructed to allow certain light rays 122 and 126 to be transmitted, at least in part, traveling through either side of buried numerical aperture expander 100. Thus, buried numerical aperture expander 100 having such reflective and transmissive properties may be utilized in various applications wherein a display may be deployed on a glass pane or similar surface in which it is desirable to display an image on the pane while still allowing the pane to be at least partially transparent to allow a user to see through the pane while simultaneously viewing the displayed image. Such an application may include, for example a head up display (HUD) of a vehicle. Such a head up display and other applications are discussed in further detail, below. In one or more embodiments, incident light rays 118 that are reflected and expanded by buried numerical aperture expander 100 may emanate from a display, and light rays 122 and 126 may be ambient light and/or light reflected off of other objects. Furthermore, in the event that some of ambient light rays 126 may be reflected by buried numerical aperture expander 100 rather than being transmitted through buried numerical aperture expander 100 impinging at an angle of incident different than the angle of incidence of light rays 118 from a display, such reflected ambient light rays 126 may be directed outside output expansion cone 128 and away from the eye of a viewer of a projected image, and the scope of the claimed subject matter is not limited in this respect.

In one or more embodiments, buried numerical aperture expander 100 comprises a first layer 112 that is light transmissive. In one or more embodiments, first layer 112 may comprise glass, plastic, Mylar, or the like and may be rigid or may alternatively be flexible to allow buried numerical aperture expander 100 to be curved or manipulated to a desired shape or curvature. An exit pupil expander 110 is disposed adjacent to first layer 112, and the exit pupil expander 110 may comprise, for example, a micro lens array (MLA) in one or more embodiments. Exit pupil expander 110 may comprise a molded liquid polymer, for example, or may be formed via other methods, for example exit pupil expander 110 may be embossed on first layer 112 via roll embossing. In one or more embodiments, exit pupil expander 110 may comprise glass or plastic beads, or microspheres or nanospheres, or similarly shaped objects capable of functioning as an optical diffuser and/or lens. Exit pupil expander 110 may have optical properties resulting from a selected pitch, radius, and/or spacing of the elements making up exit pupil expander 110 to expand incident light that is reflected from exit pupil expander 110 at a controlled angle and/or to minimize speckle effects and/or or to control any resulting interference from reflected light rays 120. Furthermore, exit pupil expander 110 may comprise various holographic elements, a diffractive grating, and/or any other optical element capable of optically expanding reflected light rays 120 to result in a controlled angle of reflection and/or interference pattern, and the scope of the claimed subject matter is not limited in this respect.

In one or more embodiments, a reflective layer 114 may be disposed on exit pupil expander 110 to impart reflective properties on exit pupil expander 110. Reflective layer 114 may comprise a thin coating of aluminum or other suitable metal having reflective properties at a desired wavelength, and may have a thickness of about 50 angstroms to allow some light to be reflected by reflective layer 114 and to also allow some light to be transmitted through reflective layer 114. The reflector may be a thin film or laminated stack of dielectric materials, or a combination of dielectric materials and metals to create reflective layer 114. In such an arrangement, reflective layer 114 may be a broadband partial reflector, although the scope of the claimed subject matter is not limited in this respect. In one or more embodiments, reflective layer 114 may be a partial reflector in that not all of the light incident upon reflective layer is reflected. For example, approximately 30% of incident light from light ray 118 may be reflected by reflective layer 114 as light rays 120, and approximately 70% of incident light from light ray 118 may be transmitted through reflective layer 114 without being reflected, however the scope of the claimed subject matter is not limited in this respect. In one or more alternative embodiments, reflective layer 114 may comprise a polarization dependent reflector in which incident light from light ray 118 having a first polarity is reflected by reflective layer 114 as expanded light rays 120, and incident light from light ray 118 having a second polarity is transmitted through reflective layer 114 without being reflected. In one or more further embodiments, reflective layer 114 may comprise one or more color selective filters in which incident light from light ray 118 having a first wavelength is reflected by reflective layer 114 as expanded light rays 120, and incident light from light ray 118 having a second wavelength is transmitted through reflective layer 114 without being reflected. Furthermore, reflective layer 114 may comprise a first polarization material in a first region of exit pupil expander 110 to reflect light having a first polarity in the first region, and may comprise a second polarization material in a second region of exit pupil expander 110 to reflect light having a second polarity in the second region, to result in dual or multiple displays. Similarly, multiple reflection selectivity may be provided using one or more color filters for reflective layer 114. Thus, reflective layer 114 may comprise one or more broadband reflectors, polarized coatings, and/or narrowband coatings, or combinations thereof. However, these are merely examples of how reflective layer 114 may be constructed to have selective reflection and transmission properties, and the scope of the claimed subject matter is not limited in this respect.

Construction of buried numerical aperture expander 100 may be completed by affixing second layer 124 to exit pupil expander 110 via an epoxy 116 or the like. Second layer 124 may comprise the same or similar material as first layer 112. In one or more embodiments, first layer 112 and second layer 124, exit pupil expander 110, and epoxy comprise materials having the same, or nearly the same, index of refraction to allow transmissive light rays 122 to pass through buried numerical aperture expander 100 without being significantly affected or distorted, for example so that the angle at which light rays 122 leave buried numerical aperture expander 100 is the same, or nearly the same, as the angle at which light rays 122 enter buried numerical aperture expander 100, although a slight offset may be permissible. Such properties of buried numerical aperture expander 100 to reflect some light with expansion, and to transmit other light without expansion allows buried numerical aperture expander to provide a virtual display in various applications, some examples of which are discussed, below.

Figure 1B:
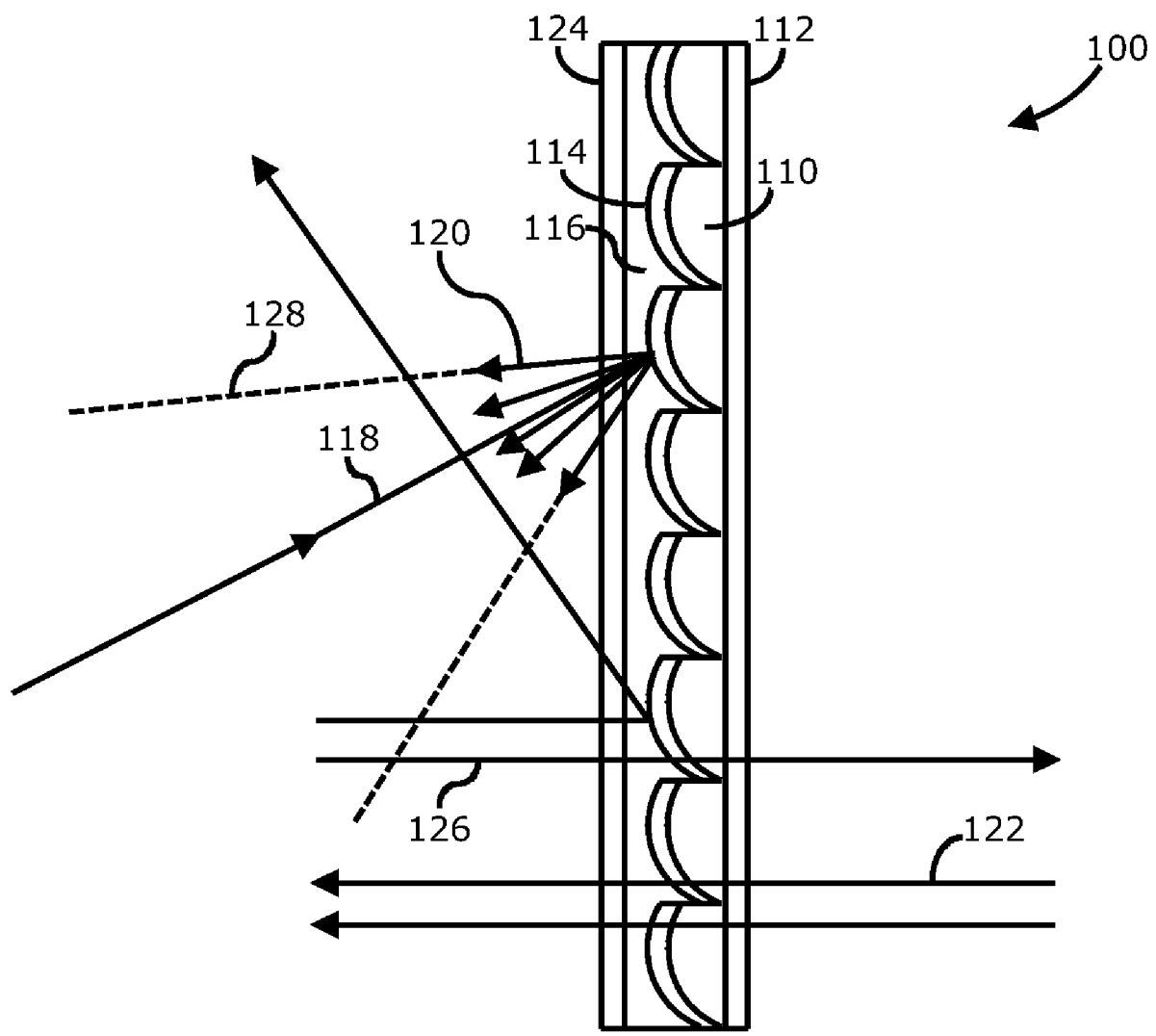
FIG. 1B is a diagram of a cross sectional view of an alternative embodiment of a buried numerical aperture expander having an asymmetrical exit pupil expander in accordance with one or more embodiments.

Referring now to FIG. 1B, a diagram of a cross sectional view of an alternative embodiment of a buried numerical aperture expander having an asymmetrical exit pupil expander in accordance with one or more embodiments will be discussed. Buried numerical aperture expander 100 as shown in FIG. 1B is substantially identical to the buried numerical aperture expander as shown in FIG. 1B, with the following differences. Exit pupil expander 110 as shown in FIG. 1B is designed to have an asymmetrical structure so that reflected light rays 120 are directed to a desired direction according to the symmetry imparted to the structures of exit pupil expander 110. For example, exit pupil expander 110 may have an asymmetrical structure to cause reflected light rays 120 to have a directional bias from the angle of reflection that would otherwise occur if exit pupil expander 110 were symmetrical, so that the angle of reflected light rays 120 is different from the angle of incident light rays 118. In the example shown in FIG. 1B, exit pupil expander 110 has an asymmetry to bias reflected light rays 120 downward which results in the output expansion cone 128 to likewise be directed downward at an angle that is different than would occur with a symmetrical exit pupil expander 110. Alternatively, exit pupil expander 110 may have an asymmetry to bias reflected light rays 120 upward which would result in output expansion cone 128 to be directed upward at a different angle than would occur with a symmetrical exit pupil expander. Such an asymmetrical structure of exit pupil expander 110 may be utilized to place output expansion cone 128 to a desired location according to the particular application in which buried numerical aperture expander is utilized. For example, in an automotive head-up display application, buried numerical aperture expander may be disposed on or within a windshield which may be positioned at an angle with respect to the direction that the driver is facing. Thus, exit pupil expander 110 may be designed to have an appropriate asymmetry to direct output expansion cone 128 to the eye of the driver so that the driver may view images projected by a display along light ray 118. In general, the asymmetry of exit pupil expander may be selected in combination with the placement of the display and angle of incidence of light rays 118 emitted from the display, the placement and angle of buried numerical aperture expander 100, and the position of the viewer of the displayed images.

Furthermore, in one or more embodiments, the asymmetry of exit pupil expander 110 may vary from element to element of exit pupil expander. For example, the asymmetry of the elements located toward the ends of exit pupil expander 110 may have more asymmetry than elements located toward the center of exit pupil expander 110, and centrally located elements may have very little or no asymmetry. Such varying asymmetry directed toward the center of exit pupil expander 110 may be utilized to result in a smaller, narrower output expansion cone 128, and such varying asymmetry directed away from the center of exit pupil expander 110 may be utilized to result in a larger, wider output expansion cone 128. Other asymmetry likewise may be imparted to exit pupil expander 110 according to the application in which buried numerical aperture expander is utilized, and the scope of the claimed subject matter is not limited in this respect. Likewise, as shown in FIG. 1A, with an asymmetrical exit pupil expander 110, reflected ambient light rays 126 originating from the same side on which the viewer is located but being incident at a different angle than the angle of incidence of light rays 118 will still be reflected outside of the output expansion cone 128 and away from the eye of the viewer, and the scope of the claimed subject matter is not limited in this respect.

Figure 2:
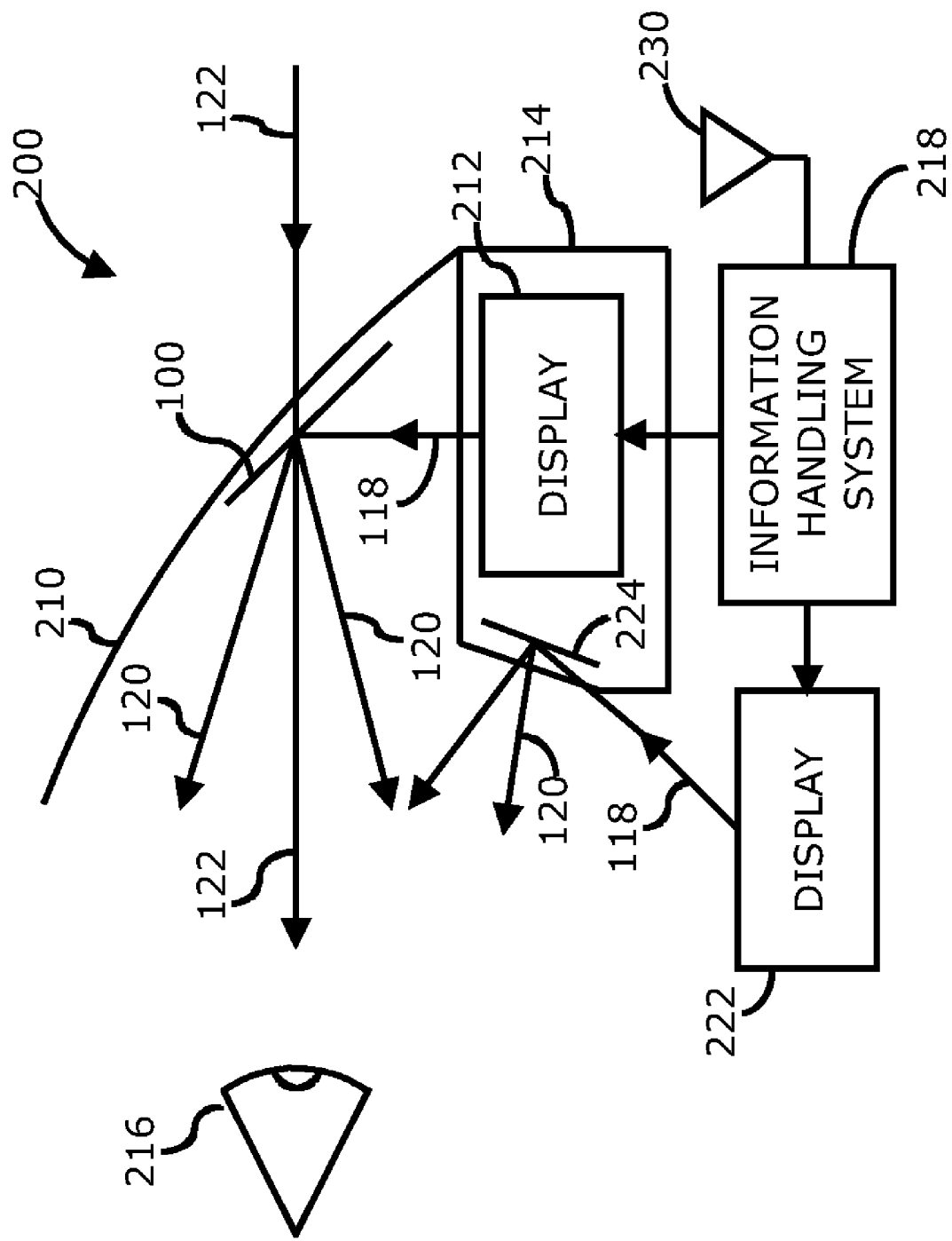
FIG. 2 is a diagram of a head up display system or the like deployed in a vehicle in accordance with one or more embodiments.

Referring now to FIG. 2, a diagram of a head up display system or the like deployed in a vehicle in accordance with one or more embodiments will be discussed. As shown in FIG. 2, buried numerical aperture expander 100 may be utilized to provide a virtual display system 200 such as a head up display (HUD) and/or a virtual instrument panel in an automobile, motorcycle, boat, helicopter, airplane, or any vehicle in which a head up display or similar virtual display may be desired. In one or more embodiments, buried numerical aperture expander 100 may be disposed adjacent to, affixed on, or disposed in windshield 210 of such a vehicle. Display 212 may be disposed within a dashboard 214 or similar enclosure of the vehicle. Alternatively, display 212 may be placed on or affixed to the exterior of dashboard, for example as an aftermarket deployment. Display 212 may be any display capable of projecting an image onto buried numerical aperture expander 100 to provide a virtual display. In one or more embodiments, display 212 may comprise a PicoP™ laser based projector available from Microvision, Inc. of Redmond, Wash., USA. Light rays 118 emanating from display 212 and impinging on buried numerical aperture expander 100 are selected to be reflected as light rays 120 which are expanded by buried numerical aperture expander 100 to project an image from display 212 within a display output cone in which light rays 120 may be detected by a user's eye 216. In such an arrangement, the user may see an image generated by display 212 when eye 216 is positioned to receive light rays 120. In addition, ambient light rays 122 may pass through windshield 210 and buried numerical aperture expander 100 so that the user may see through buried numerical aperture expander 100 to allow unimpaired operation of the vehicle. Furthermore, as shown in and described with respect to FIG. 1A and FIG. 1B, any ambient light beams that may originate from the same side the viewer that may be reflected by buried numerical aperture expander 100 may be directed outside of the output expansion cone and away from the eye 216 of the driver of the vehicle or other viewer of the image projected by display 212, and the scope of the claimed subject matter is not limited in this respect.

In one or more embodiments, display 212 may be coupled to and/or incorporated within an information handling system 218 from which the images displayed by display 212 may be stored, generated, and/or received. In one or more embodiments, information handling system 218 may comprise a cell phone or similar device capable of receiving information from a wireless network via antenna 230 to be displayed via display 212, a global positioning system capable of receiving data from a constellation of satellites via antenna 230 from which position data may be calculated to be displayed via display 212, a navigation system from which navigation data may be displayed via display 212, a media device such as a music or video player from which information may be displayed via display 212, and so on. Thus, information handling system 218 may be installed in the dashboard 214 of the vehicle at the factory, or may be installed or otherwise deployed by the user or third party after the purchase of the vehicle, and the scope of the claimed subject matter is not limited in this respect.

In one or more embodiments, buried numerical aperture expander 100 may be utilized to provide a virtual instrument panel or cluster, for example to display data regarding the operation of the vehicle, such as a speedometer, tachometer, fuel gage, mileage gate, trip meter, engine temperature, warning or indicator lights, and so on. In some embodiments, such information may be displayed via buried numerical aperture expander 100 in a head up display arrangement by allowing ambient light rays 122 to be transmitted through buried numerical aperture expander. In some embodiments, the contrast of such a display may be increased such that the amount of light rays 122 transmitted through buried numerical aperture expander 100 may be reduced or eliminated wherein buried numerical aperture expander 100 may primarily function to reflect and expand light emanating from display 212. In some embodiments, buried numerical aperture expander 100 may have a selectable transmissivity feature, for example to allow a passenger to watch a movie or other media displayed via buried numerical aperture expander 100 wherein a buried numerical aperture expander 100 is positioned in front the passenger and not directly in front of the driver or operator of the vehicle. Buried numerical aperture expander 100 may be imparted with such a selectable transmissivity, for example by constructing first layer 112 to be made from an electrochromic or photochromic material, or adding an electrochromic or photochromic material between exit pupil expander 110 and first layer 112 such that applying a voltage to the electrochromic material will reduce the transmissivity of buried numerical aperture expander 100 and/or increase contrast of the viewable image projected from display 212 reflected off of buried numerical aperture expander 100. In the case where a photochromic material is utilized, for example a reversible photochromic material, light rays 118 emanating from display 212 and/or display 222 may have an ultraviolet (UV) wavelength wherein UV light rays 118 may cause the transmissivity of the photochromic material to change, thereby increasing the contrast of the displayed image projected from display 212 and/or display 222. In some embodiments, a reconfigurable virtual instrument cluster may be implemented by disposing another buried numerical aperture expander 224 within dashboard 214 and using the original display 212 or alternatively a different display 222 to impinge light rays 118 on buried numerical aperture expander 224 and to expand reflected light rays 120 to provide a virtual instrument cluster display or the like, although the scope of the claimed subject matter is not limited in this respect.

Figure 3:
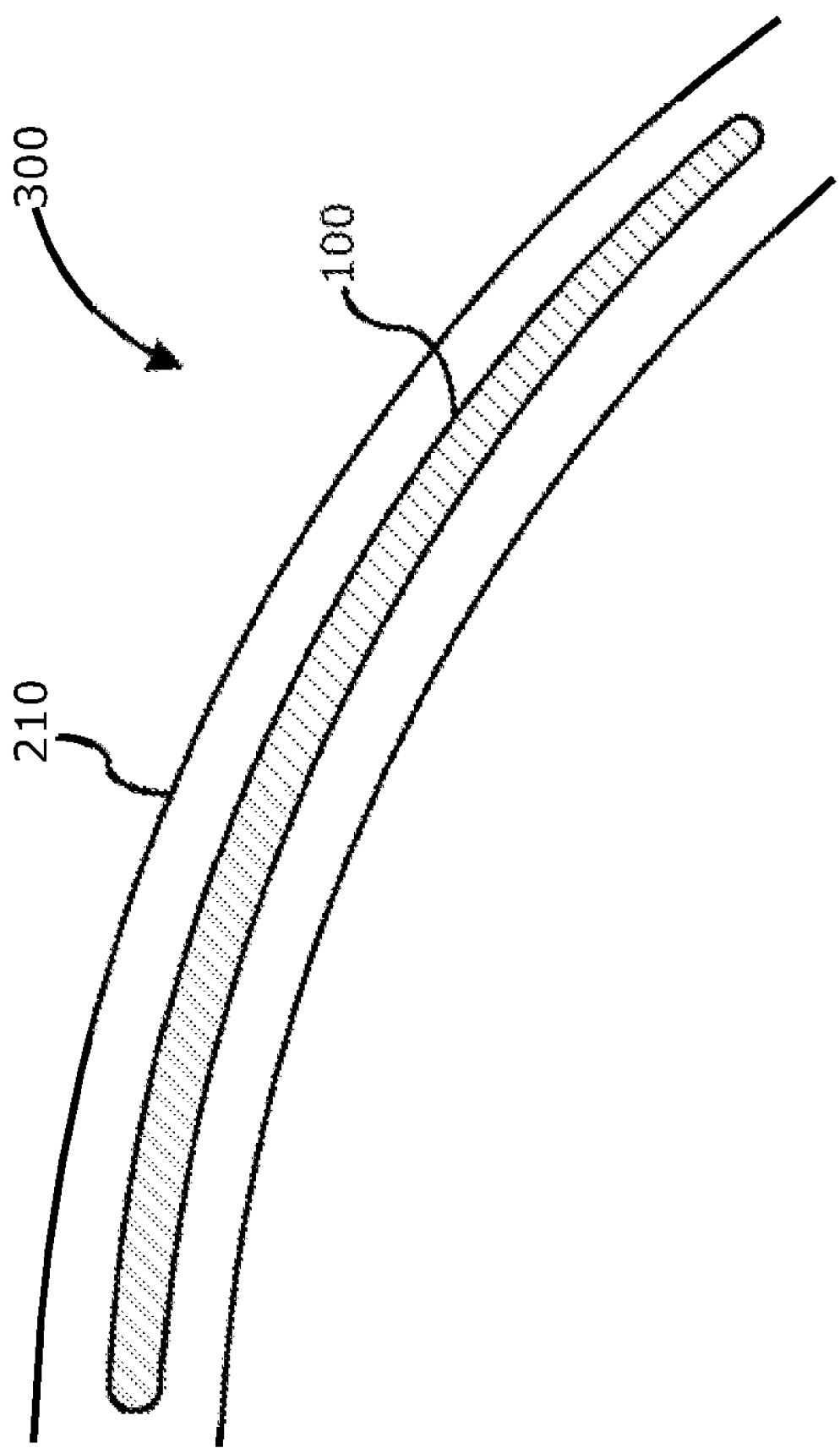
FIG. 3 is a diagram of a cross sectional view of a buried numerical aperture expander embedded in a windshield or the like in accordance with one or more embodiments.

Referring now to FIG. 3, a diagram of a cross sectional view of a buried numerical aperture expander embedded in a windshield or the like in accordance with one or more embodiments will be discussed. As shown in FIG. 3, a virtual display windshield 300 may comprise buried numerical aperture expander 100 disposed within windshield 210. In one or more embodiments, buried numerical aperture expander 100 may have a construction as shown in and described with respect to FIG. 1 in which buried numerical aperture expander 100 comprises an exit pupil expander 110 having reflective layer 114 and being disposed between first layer 112 and second layer 124 with epoxy layer 116, wherein such a buried numerical aperture expander 100 is disposed in windshield 210 when windshield 210 is manufactured. Alternatively, buried numerical aperture expander 100 may comprise exit pupil expander 110 having a reflective layer 114 and being disposed within windshield 210 without requiring first layer 112 and second layer 124 and/or epoxy layer 116 since the material from which windshield 210 is made may replace the function of first layer 112 and second layer 124 and/or epoxy layer 116. Such an arrangement of buried numerical aperture expander 100 may be referred to as a buried partially reflective layer. In one or more embodiments, buried numerical aperture expander 100 may be disposed within windshield 210 to be posited at or near Brewster's angle with respect to the angle of incidence of light rays 118 emitted from display 222. Furthermore, such an arrangement of buried numerical aperture expander 100 disposed within windshield 210 to provide a virtual display windshield 300 may reduce or eliminate a need to have windshield 210 be wedged, that is having two edges being slightly non-parallel to eliminate ghost images, although the scope of the claimed subject matter is not limited in this respect.

Figure 4:
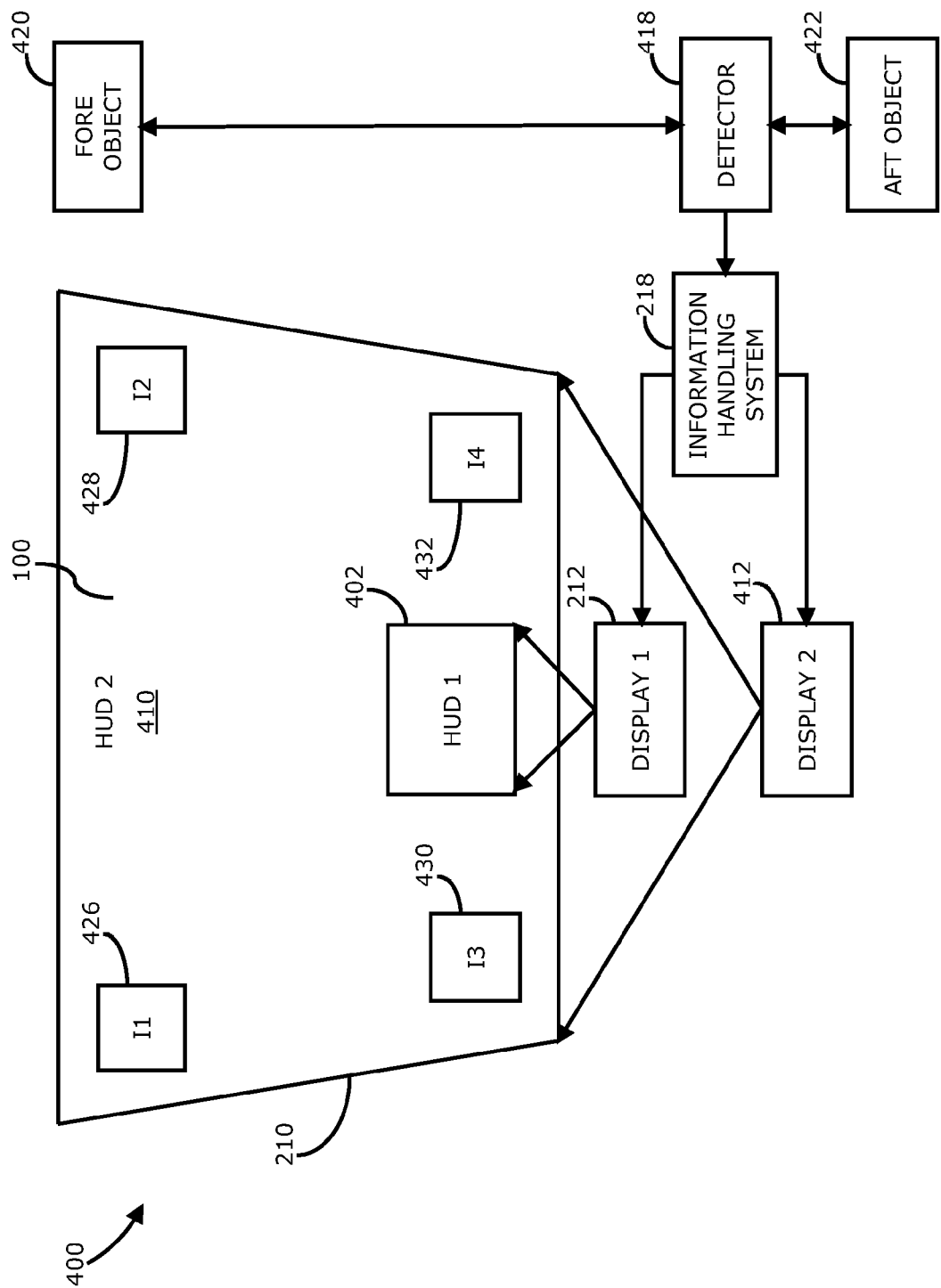
FIG. 4 is a diagram of a multiple display system utilizing a buried numerical aperture expander embedded in a windshield or the like in accordance with one or more embodiments.

Referring now to FIG. 4, a diagram of a multiple display system utilizing a buried numerical aperture expander embedded in a windshield or the like in accordance with one or more embodiments will be discussed. As shown in FIG. 4, multiple display system 400 may comprise a first display region (HUD 1) 402 and a second display region (HUD 2) 410. In one or more embodiments, buried numerical aperture expander 100 may be disposed within windshield 210 to reflect and expand images projected by display 412, whereas images projected by display 212 may be reflected off of an inner surface of windshield 210 rather than being reflected off of buried numerical aperture expander 100, thus resulting in images in display region 402 being located at a different focal length than images in display region 410. First head up display region 402 may receive images provided by display 212 in a more narrow field of view (FOV), and second head up display region 410 may receive images provided by display 412 in a wider field of view (FOV). In one or more embodiments, first display region 402 may be at least partially contained within second display region 410. Display 212 may display vehicle operational information such as speed, RPMs, and so on, within first display region 402, and may be referred to as a higher class display since the beam provided by display 212 may be reflected off the inner surface of windshield 210 to provide a virtual image located some distance beyond windshield 210 outside of the vehicle. The light emitted from display 212 does not get significantly reflected back to the driver off of buried numerical aperture expander 100. Furthermore, display 212 also may be referred to as a higher class display when information is displayed in first display region 402 with a higher pixel density and/or resolution within a smaller sized area. Display 412 may display other information useful for the driver or operator of the vehicle, such as cruise control information, adaptive cruise control information, night vision information, collision avoidance information, lane departure detection and warning, parking assist information, and/or blind spot detection information, and so on, and may be referred to as a lower class display since the beam provided by display 412 may be reflected off buried numerical aperture expander 100 disposed within windshield 210 to provide a virtual image located on or near windshield 210, and/or at a closer distance to the driver than the virtual image displayed in first display region 402. Likewise, display 412 also may be referred to as a lower class display if information is displayed within second display region 410 with a lower pixel density and/or resolution. In one or more embodiments, display 212 and display 412 may be contained within the same module, or alternatively may actually be a single module capable of providing images for two or more displays, although the scope of the claimed subject matter is not limited in this respect.

Information displayed by display 212 and/or display 412 may be stored in, processed by, and or received by information handling system 218. For example, a detector 418 may be utilized to detect a fore object 420 in front of the vehicle and/or an aft object 422 behind the vehicle. For example, detector 418 may comprise light detection and ranging (LIDAR) equipment, radio detection and ranging (RADAR) equipment, night vision equipment, camera equipment, or the like, to detect and/or image fore object 420 and/or aft object 422. If fore object 420 is detected to the front left of the vehicle by detector 418, information handling system 218 may cause display 212 to display an image (I1) 426 in the upper left hand corner of second display region 410. If fore object 420 is detected to the front right of the vehicle, an image (I2) 428 may be displayed in the upper right hand corner of second display region 410. Similarly, if detector detects aft object 422 to the rear left or rear right of the vehicle, image (I3) 430 or image (I4) 432 may be displayed in the lower left hand side or the lower right hand side, accordingly, to indicate the presence and relative location of aft object 422 with respect to the vehicle. Such images may comprise indicators or indicia representative of an object, or alternatively the images may be actual images of the detected object if an image of the object is captured by detector 418. In one or more embodiments, images may be simultaneously displayed within first display region 402 and second display region 410, however the scope of the claimed subject matter is not limited in this respect. In one or more embodiments, one or both of first display region 402 or second display region 410 may be embedded within windshield 210, or one or both of first display region 402 or second display region 410 may be affixed to or adjacent to windshield 210. Furthermore, in one or more embodiments, the light beams emanating from one or both of display 212 or display 412 may be directed to a preselected subset of second display region 410 to provide a higher class display in addition to the rest of first display region 402 being a lower class display. For example, an image may be displayed by display 412 at the location of image 432 to provide a higher resolution, higher pixel density image for a passenger to view. Likewise, at least a portion of first display region 402 and/or second display region 410 may have a controllable transmissivity as discussed, above. However, these are merely examples of how multiple display system 400 may be utilized, and the scope of the claimed subject matter is not limited in this respect.

Figure 5:
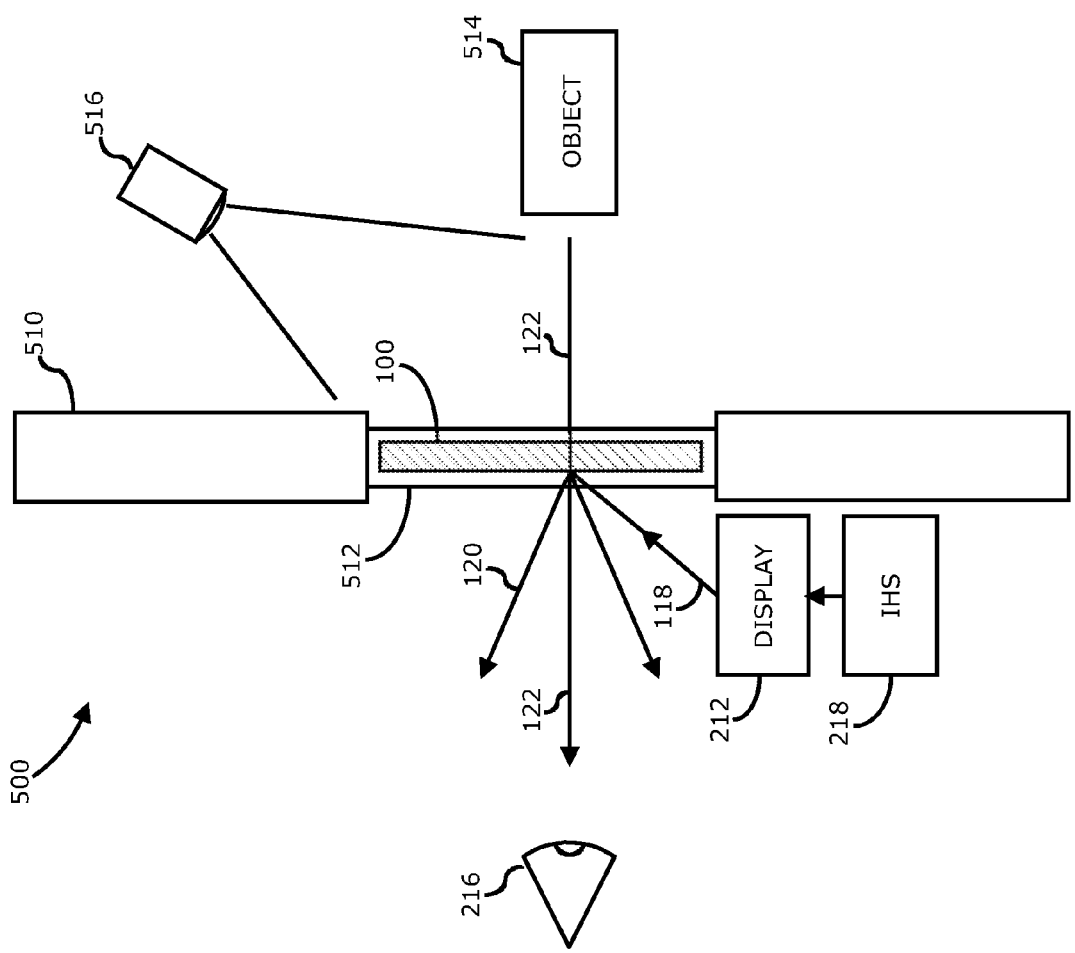
FIG. 5 is a diagram of a buried numerical aperture expander deployed in conjunction with a window of a building or a vehicle in accordance with one or more embodiments.

Referring now to FIG. 5, a diagram of a buried numerical aperture expander deployed in conjunction with a window of a building or a vehicle in accordance with one or more embodiments will be discussed. Display system 500 of FIG. 5 shows one or more alternative embodiments in which buried numerical aperture expander 100 may be deployed in addition to a head up display (HUD) or a virtual instrument panel. Wall 510 may comprise a wall of a building or the wall of a vehicle such as a train, light rail, bus, or similar vehicle, having a window 512 disposed in wall 510. In the case where wall 510 is part of a building or similar structure, the user or viewer may be located inside or outside of the building. In the case where wall 510 is part of a vehicle, the user or viewer may be located inside or outside of the vehicle. Information handling system (IHS) 218 and display 212 may be used to display an image on window 512, for example to provide an advertisement or other store or business related information, while still allowing the user or viewer to see through window 512 from the outside inward and/or from the inside outwards. Thus, light rays 118 emanating from display 212 may be reflected from buried numerical aperture expander 100 to result in reflected rays 120 that are expanded so that the user or viewer can see a virtual image when the user's eye 216 is located within the display cone. Likewise, ambient light rays 122 may pass through buried numerical aperture expander 100 so that the user is able to simultaneously view an object 514 disposed on the opposite side of wall 510 from the location of the user. In one or more embodiments, a light 516 may be utilized to prevent viewers located on the same side of wall 510 that light 516 is located from seeing through window 512, while still allowing viewers located on the opposite side of wall 510 that light 516 is located to see through window 512. Likewise, the transmissivity of buried numerical aperture expander 100 may be controlled as discussed herein to control the contrast of the image displayed on buried numerical aperture expander. In one or more embodiments, system 500 may be utilized as part of an entertainment system in the user's home so that the user may watch a television program, digital video disk, movie, multimedia file, picture, slideshow, presentation, or the like projected onto buried numerical aperture expander 100 by display 212. In addition, system 500 may be deployed in a museum, theatre, club, magic show, or the like type of cultural or entertainment environments. In one or more embodiments, display system may be a billboard or other sign that is capable of displaying an advertisement or message via buried numerical aperture expander 100 will still allowing the billboard or sign to be light transmissive to ambient light and therefore transparent to reduce or minimize the impact of the billboard or sign on impairing the environmental view. However, these are merely examples of where buried numerical aperture expander 100 may be deployed, and the scope of the claimed subject matter is not limited in this respect.

Figure 6:
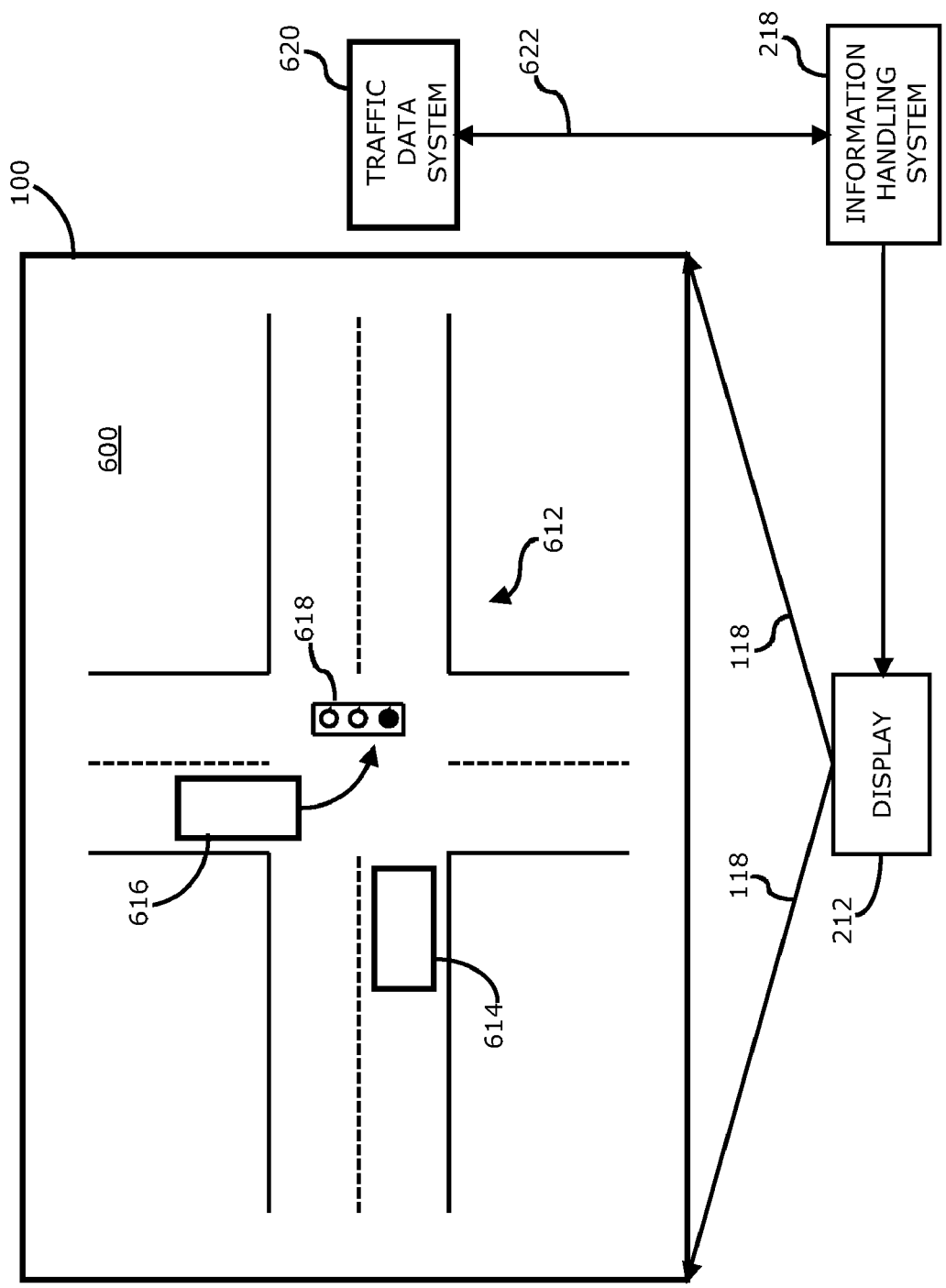
FIG. 6 is a diagram of a traffic data display system utilizing a buried numerical aperture expander in accordance with one or more embodiments.

Referring now to FIG. 6, a diagram of a traffic data display system utilizing a buried numerical aperture expander in accordance with one or more embodiments will be discussed. In the traffic data display system 600 of FIG. 6, buried numerical aperture expander 100 may be utilized in conjunction with display 212 to display traffic data received from traffic data system 620. Traffic data system 620 may collect real-time, or near-real time, traffic data for a roadway or intersection 612, for example from various in ground sensors, cameras, RADAR, or LIDAR type sensors, that may be provided via wireless link 622 to information handling system 218 located in the vehicle. Information handling system 218 provides the information to display 212 which projects traffic data as an image and/or indicia onto buried numerical aperture expander 100 which reflects and expands light rays 118 emanating from display 212 as previously discussed herein. In one or more embodiments, the traffic data may include, for example, a map or image of an upcoming intersection 612 that the vehicle is approaching. The traffic data may include information regarding the status of the upcoming traffic signal 618, the location of other vehicles 614 and 616 at or near intersection 612, and the speed and/or direction of travel of the vehicles. For example, the traffic data displayed via buried numerical aperture expander 100 may indicate that vehicle 616 is turning at intersection 612 in the path of the present vehicle so that the driver or operator of the present vehicle may slow down to avoid a possible collision. Traffic data display system 600 of FIG. 6 represents one type of system in which information about other vehicles relative to the present vehicle may be displayed in a head up type display, however other types of vehicle data information may be displayed, for example in marine systems where traffic data display system 600 is deployed in a boat or ship and is capable of displaying information regarding other boats or ships in the vicinity of the present boat or ship, in an aviation system, in a train, light rail or subway system, in an automotive race system at a race track, in a military application deployed in a tank, helicopter, or airplane, and so on, and the scope of the claimed subject matter is not limited in this respect.

Figure 7:
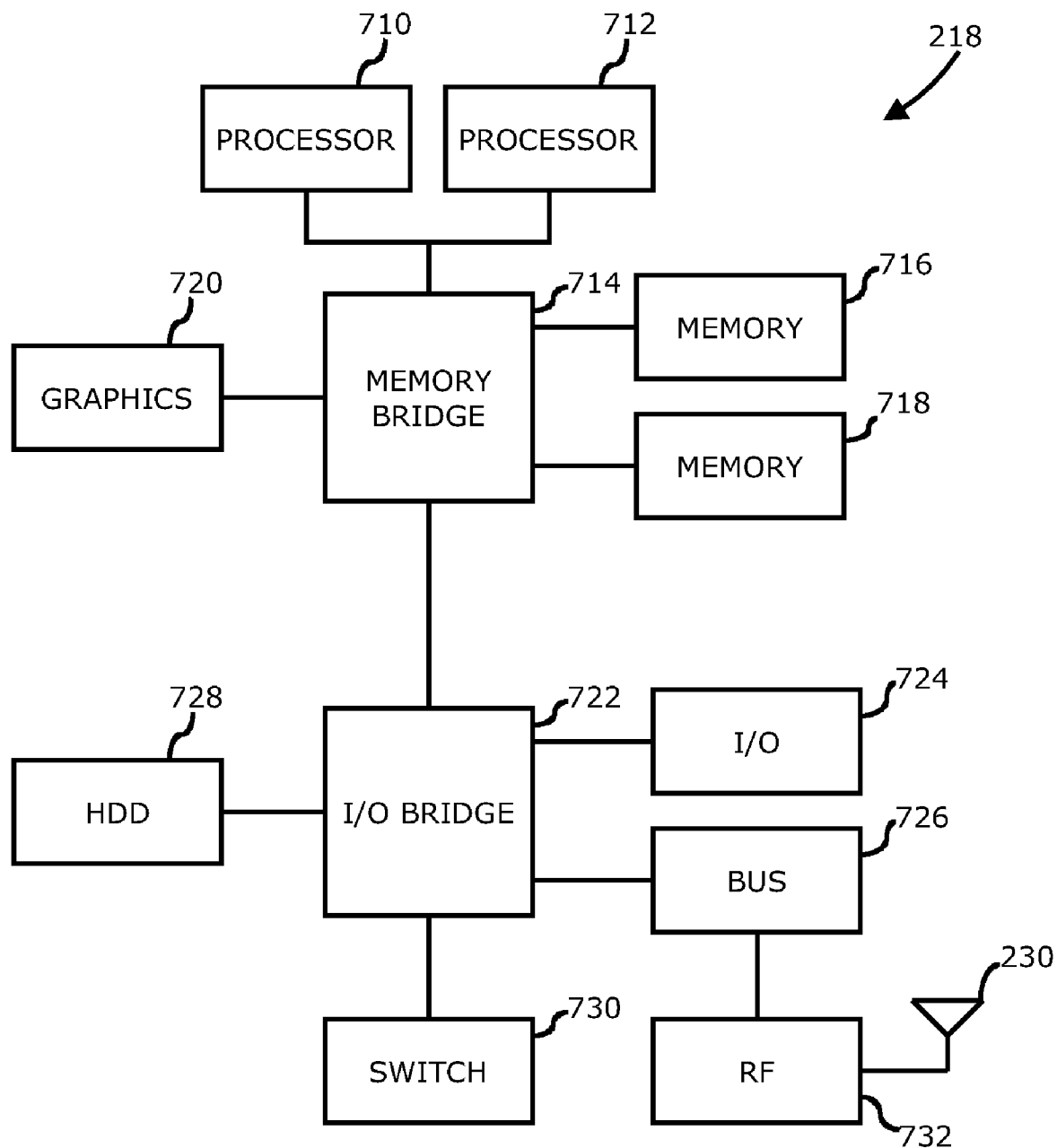
FIG. 7 is a block diagram of an information handling system capable of being utilized in conjunction with a display and a buried numerical aperture expander in accordance with one or more embodiments.

Referring now to FIG. 7, a block diagram of an information handling system capable of being utilized in conjunction with a display and a buried numerical aperture expander in accordance with one or more embodiments will be discussed. Information handling system 218 of FIG. 7 may tangibly embody the information handling systems as shown in and described with respect to FIG. 2, FIG. 4, FIG. 5, or FIG. 6. Although information handling system 218 represents one example of several types of computing platforms, information handling system 218 may include more or fewer elements and/or different arrangements of elements than shown in FIG. 7, and the scope of the claimed subject matter is not limited in these respects.

Information handling system 218 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor based memory, for example volatile type memory and/or non-volatile type memory. Memory bridge 714 may couple to a graphics system 720 to drive a display device such as, for example, display 212 or display 222 of FIG. 2 coupled to information handling system 218.

Information handling system 218 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 218. Bus system 726 may comprise one or more bus systems such as a peripheral component interconnect (PCI) express type bus or the like, to connect one or more peripheral devices to information handling system 218. A hard disk drive (HDD) controller system 728 may couple one or more hard disk drives or the like to information handling system, for example Serial ATA type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information handling system 218 may include a radio-frequency (RF) block 732 comprising RF circuits and devices for wireless communication with other wireless communication devices and/or via wireless networks, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to a buried numerical aperture expander having transparent properties and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A buried numerical aperture expander, comprising:
    an exit pupil expander having a surface with a light scattering profile, wherein the light scattering profile results from at least one of a selected shape and spacing of elements making up the surface; and
    a reflective layer disposed on the surface of said exit pupil expander;
    said exit pupil expander and said reflective layer being disposed within an envelope, said exit pupil expander and said envelope having the same, or nearly the same, coefficient of refraction;
    wherein some light impinging on said exit pupil expander may be at least partially reflected by said reflective layer and expanded into a larger output numerical aperture, and some light impinging on said exit pupil expander is at least partially transmitted without substantial distortion through said reflective layer.

2. A buried numerical aperture expander as claimed in claim 1, wherein said exit pupil expander comprises at least one of a micro lens array, microspheres, nanospheres, a diffuser, and a diffraction grating.

3. A buried numerical aperture expander as claimed in claim 1, said exit pupil expander and said reflective layer being disposed within a first layer and a second layer, wherein an epoxy is disposed between the second layer and said reflective layer, said exit pupil expander, said epoxy, and said first and second layers having the same, or nearly the same, coefficient of refraction.

4. A buried numerical aperture expander as claimed in claim 1, said reflective layer comprising at least one of a metal and having a thickness of approximately 50 angstroms, and a dielectric stack.

5. A buried numerical aperture expander as claimed in claim 1, said exit pupil expander being capable of reducing speckle in an image reflected off of said reflective layer.

6. A buried numerical aperture expander as claimed in claim 1, further comprising a transmissivity control layer capable of controlling an amount of light that is at least partially transmitted through said reflective layer, wherein the transmissivity control layer comprises at least one of an electrochromic layer or a photochromic layer, and a liquid crystal layer.

7. A buried numerical aperture expander as claimed in claim 1, wherein said reflective layer comprises at least one of a broadband partial reflector, a polarization dependent reflector, and a color selective filter.

8. A buried numerical aperture expander as claimed in claim 1, said exit pupil expander having a structure capable of causing said reflective layer to reflect at least some incident ambient light away from an eye of a viewer.

9. A buried numerical aperture expander as claimed in claim 1, said exit pupil expander having a structure capable of causing said reflective layer to reflect light projected from a display at an angle different than an angle of incidence of the projected light.

10. A display system, comprising:
    a buried numerical aperture expander, wherein the buried numerical aperture expander comprises:
        an exit pupil expander having a surface with a light scattering profile, wherein the light scattering profile results from at least one of a selected shape and spacing of elements making up the surface;
        a reflective layer disposed on the surface of said exit pupil expander; and
    a display capable of projecting an image onto said buried numerical aperture expander;
    wherein said buried numerical aperture expander is capable of expanding the beams projected onto said buried numerical aperture expander so as to make the projected image viewable over a controlled viewing region, and is further capable of allowing other light to be transmitted through the reflective layer and said buried numerical aperture expander without substantially distorting the transmitted light.

11. A display system as claimed in claim 10, wherein said display comprises at least one of a scanned beam display, digital light processing displays, liquid-crystal display microdisplays, and a liquid-crystal on silicon display.

12. A display system as claimed in claim 10, wherein said buried numerical aperture expander is disposed in at least one of a window of a building or vehicle, disposed on a surface of a window of a building or vehicle, and is disposed adjacent to a window of a building or vehicle.

13. A display system as claimed in claim 10, wherein said display is disposed in at least one of a cell phone, a media player, a navigation system, and a global positioning system.

14. A display system, comprising:
    a buried numerical aperture expander corresponding to a first display region, wherein the buried numerical aperture expander comprises:
        an exit pupil expander having a surface with a light scattering profile, wherein the light scattering profile results from at least one of a selected shape and spacing of elements making up the surface;

a reflective layer disposed on the surface of said exit pupil expander;
a first display capable of projecting a virtual image at a location different than a location of said buried numerical aperture;
a second display capable of projecting an image onto said buried numerical aperture expander;
wherein said buried numerical aperture expander is capable of expanding the beams projected onto said buried numerical aperture expander to make the projected image viewable over a controlled viewing region by said second display, and is further capable of allowing other light to be transmitted through the reflective layer and said buried numerical aperture expander without substantially distorting the transmitted light.

15. A display system as claimed in claim 14, wherein the increased field of view of the image reflected off of said buried numerical aperture expander is greater than a field of view of the image projected by said first display.

16. A display system as claimed in claim 14, further comprising a detector coupled to the second display, wherein the image projected onto said buried numerical aperture expander comprises information obtained via the detector.

17. A windshield capable of being utilized in a head-up display, comprising:
a windshield layer;
an exit pupil expander embedded in the windshield layer, wherein the exit pupil expander has a surface with a light scattering profile, wherein the light scattering profile results from at least one of a selected shape and spacing of elements making up the surface;
a reflective layer disposed on said exit pupil expander;
wherein some light impinging on said exit pupil expander may be at least partially reflected by said reflective layer and expanded into a larger output numerical aperture, and some light impinging on said exit pupil expander is at least partially transmitted through said reflective layer substantially without distortion.

18. A windshield as claimed in claim 17, wherein at least one of said exit pupil expander and said reflective layer are disposed in the windshield layer at or near Brewster's angle with respect to an angle of incidence of the reflected light.

19. A buried numerical aperture expander, comprising:
an exit pupil expander having a surface with a light scattering profile, wherein the light scattering profile results from at least one of a selected shape and spacing of elements making up the surface;
a reflective layer disposed on said exit pupil expander, wherein some light impinging on said exit pupil expander may be at least partially reflected by said reflective layer and expanded into a larger output numerical aperture; and
an opaque layer disposed adjacent to said exit pupil expander, said opaque layer being capable of absorbing a substantial majority of light originating from the side nearest the opaque layer and also absorbing a substantial amount of light originating from the side away from the opaque layer that is partially transmitted through said exit pupil expander.

20. A buried numerical aperture expander as claimed in claim 19, wherein said exit pupil expander comprises at least one of a micro lens array, microspheres, nanospheres, a diffuser and a diffraction grating.

21. A buried numerical aperture expander as claimed in claim 19, said reflective layer comprising at least one of a metal and having a thickness of approximately 50 angstroms, and a dielectric stack.

22. A buried numerical aperture expander as claimed in claim 19, said exit pupil expander being capable of reducing speckle in an image reflected off of said reflective layer.

23. A buried numerical aperture expander as claimed in claim 19, wherein said reflective layer comprises at least one of a broadband partial reflector, a polarization dependent reflector, and a color selective filter.

24. A buried numerical aperture expander as claimed in claim 19, said exit pupil expander having a structure capable of causing said reflective layer to reflect at least some incident ambient light away from an eye of a viewer.

25. A buried numerical aperture expander as claimed in claim 19, said exit pupil expander having a structure capable of causing said reflective layer to reflect light projected from a display at an angle different than an angle of incidence of the projected light.

* * * * *